United States Patent [19]

Sparrow et al.

[11] Patent Number: 4,925,619
[45] Date of Patent: May 15, 1990

[54] ROD PRESSURIZATION SENSING APPARATUS

[75] Inventors: James A. Sparrow; John J. McEvoy, both of Columbia, S.C.

[73] Assignee: Westinghouse Electric Corp., Pittsburgh, Pa.

[21] Appl. No.: 353,563

[22] Filed: May 18, 1989

[51] Int. Cl.$^5$ .......................................... G21C 17/00
[52] U.S. Cl. .............................. 376/258; 376/245; 73/730; 33/DIG. 13
[58] Field of Search .............. 376/247, 258, 245, 251; 73/760, 730, 774, 781; 33/502, 555.1, 555.4, 514.1, 514.2, DIG. 13

[56] References Cited

U.S. PATENT DOCUMENTS

| | | |
|---|---|---|
| 2,419,061 | 4/1947 | Emery . |
| 2,815,424 | 12/1957 | Painter . |
| 3,149,492 | 9/1964 | Weinberg ............................. 73/730 |
| 3,433,060 | 3/1969 | Ives et al. . |
| 3,535,937 | 10/1970 | Wiggins et al. ....................... 73/730 |
| 3,937,212 | 2/1976 | Fletcher et al. . |
| 4,020,673 | 5/1977 | Welty et al. ......................... 376/247 |
| 4,108,719 | 8/1978 | Olshausen ............................ 376/245 |
| 4,197,754 | 4/1980 | Ostendorf et al. . |
| 4,646,563 | 3/1987 | Jones .................................... 73/730 |

FOREIGN PATENT DOCUMENTS 700776  11/1979  U.S.S.R. .
848992   7/1981  U.S.S.R. .

Primary Examiner—Daniel Wasil

[57] ABSTRACT

An apparatus is disclosed for determining pressurization in a nuclear fuel rod and the like by measuring the increase in diameter of the fuel rod occasioned by the internal pressurization of the rod, and which includes an elongate receiving member having front and rear ends and an axial opening extending therein. A gauge is positioned in the axial opening and is adapted to coaxially surround the fuel rod and then measure an increase in diameter of a fuel rod caused by a pressure increase within the rod. The gauge is formed from a substantially C-shaped bracket having inner and outer surfaces, spaced distal end portions and a more thin medial portion, and with a strain gauge mounted on both the inner and outer medial surfaces. A microprocessor is connected to the strain gauges so that changes in electrical output from the strain gauges can be measured to determine the increase in diameter of the fuel rod upon pressurization of the fuel rod.

16 Claims, 1 Drawing Sheet

U.S. Patent
May 15, 1990
4,925,619
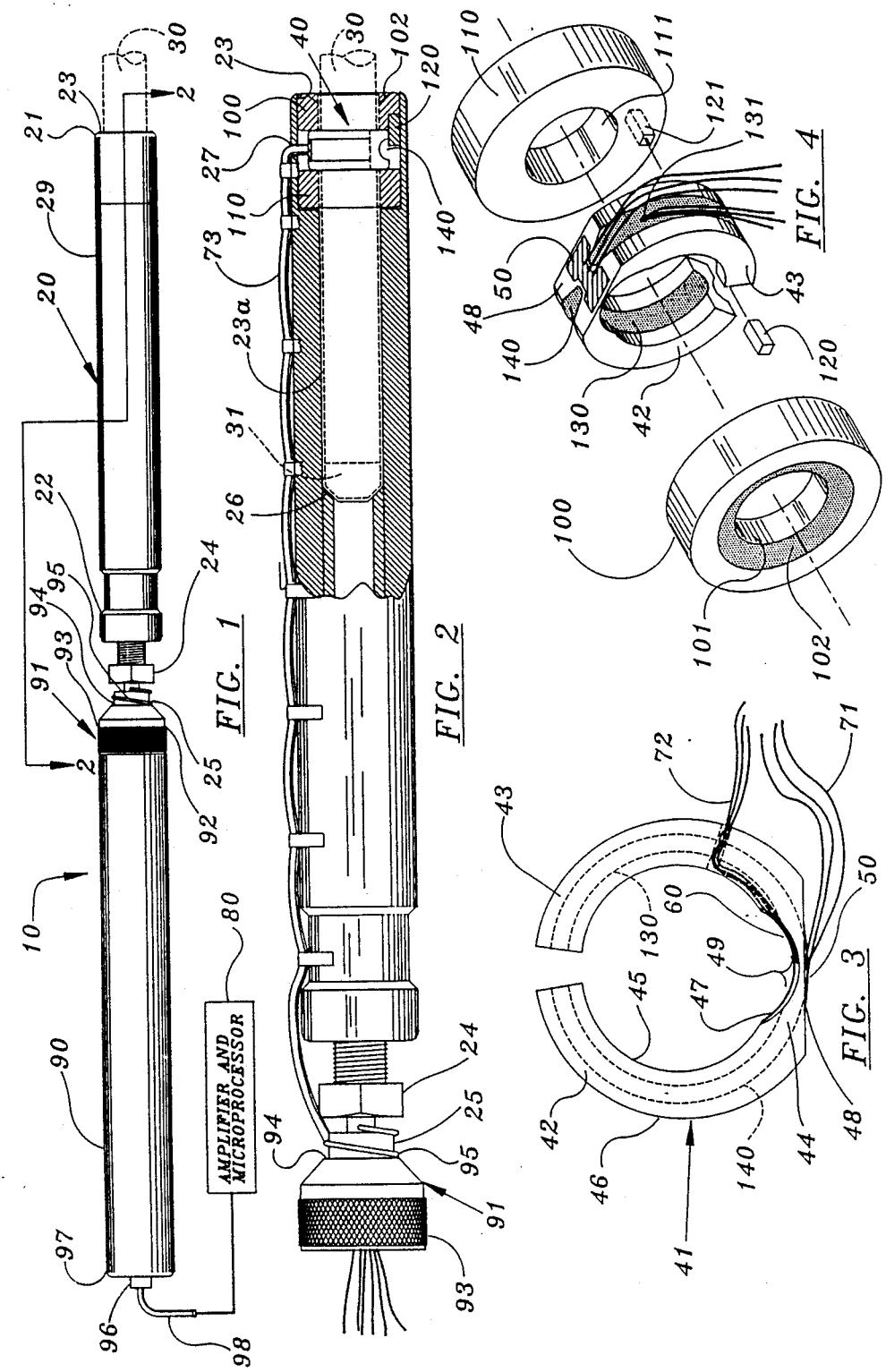

ROD PRESSURIZATION SENSING APPARATUS

This invention relates to an apparatus for determining pressurization in a nuclear fuel rod and the like, and more particularly to an apparatus for determining pressurization in a nuclear fuel rod by measuring the increase in diameter of the rod occasioned by its internal pressurization.

BACKGROUND OF THE INVENTION

A nuclear reactor core is formed from a multiplicity of fuel rods and other core component rods positioned in a multicluster skeleton framework having as many as 264 fuel rods. The fuel rods are pressurized with an inert gas. The high pressure in the fuel rods minimizes the possibility that the rods will collapse under the high pressures attendant a nuclear reactor core. The inert gas also increases heat transfer of the rods.

The fuel rods typically are manufactured from open-ended tubular rods. The fuel rods are made from a material having a low thermal neutron cross section such as a zirconium alloy while many core component rods are made from a more conventional stainless steel or other high alloy steel. One end of the rod is plugged and then girth welded by conventional tungsten inert gas methods. Fissionable pellets, or as with control rods, hafnium or boron neutron absorbent pellets, are inserted into the open end of the rod which then is plugged with a sealing plug. Depending on the design of the sealing plug, the fuel rod is pressurized through an axial opening located in the sealing plug or through pressurization slots located between the inner and outer clads conventionally found in some core component rods. After pressurization, the rods are seal welded to prevent depressurization.

However, during the initial girth welding operation used to weld the sealing plug to the fuel rod or to weld the ends of double clads together, sometimes the axial opening or pressurization slots are welded closed. Because the axial opening and pressurization slots are small in comparison with the fuel or control rods, and the rod end typically is contained in an enclosed glove or other pressurization or vacuum chamber during girth and seal welding, the fused axial opening or pressurization slots may not be noticed. As a result, the fused openings or pressurization slots prevent full pressurization of the rods. When the underpressurized rods are contained in a nuclear reactor core, the high pressures attendant the reactor core operation could collapse the rods and create reactor operational problems.

Heretofore, statistical process control has been used to determine the possibility that some welded fuel and control rods are underpressurized. Samples from select lots of fuel and core component rods are subject to destructive testing to determine if the rods are adequately pressurized. Based upon a statistical analysis of the results, groupings of fuel and control rods are rejected or accepted. However, one sample rod from a select rod lot is not representative of the quality of all rods in the lot. Accordingly, only individual testing of every welded fuel or control rod can give complete accuracy to determine whether rods are adequately pressurized. This is impossible as long as destructive testing is continued.

It is therefore an object of the present invention to provide an apparatus for determining pressurization in a nuclear fuel rod and the like without destructive testing.

It is a more particular object of the present invention to provide an apparatus for determining pressurization in a nuclear fuel rod and the like prior to seal welding the end of the rod.

It is still another object of the present invention to provide an apparatus for determining pressurization in a nuclear fuel rod and the like by measuring the increase in diameter of the rod occasioned by its internal pressurization.

It is still another object of the present invention to provide a gauge adapted for determining the increase in diameter of a tube or other rod-like object such as caused by pressurization therein.

SUMMARY OF THE INVENTION

These and other objects and advantages of the present invention are accomplished by an apparatus for determining pressurization in a nuclear fuel rod and the like which measures the increase in diameter of the rod occasioned by the internal pressurization of the rod. The apparatus includes an elongate receiving member having front and rear ends. The front end has an axial opening extending into the member and defines a central axis. The axial opening is adapted to receive at least one end of a fuel rod coaxially therein.

Gauging means is positioned in the axial opening and measures the increase in diameter of a fuel rod caused by a pressure increase within the rod. The gauging means comprises a substantially C-shaped bracket having spaced, distal end portions and a medial portion intermediate the distal end portions. The distal end portions are substantially greater in radial thickness than the medial portion. The bracket also includes spaced inner and outer surfaces which are circumferential to the central axis. The inner bracket surface is dimensioned to frictionally receive the end of a nuclear fuel rod therethrough so that the distal end portions are biased inwardly around the fuel rod. A first electrical resistance strain gauge means is mounted on the outer surface at the medial portion and a second electrical resistance strain gauge means is mounted on the inside surface at the medial portion.

Processing means is electrically connected to the first and second strain gauge means and measures the electrical output from the strain gauge means. Any changes in electrical output from the strain gauge means are measured to determine the increase in the diameter of the fuel rod positioned within the axial opening upon pressurization of the fuel rod.

In the preferred embodiment, the elongate receiving member includes means positioned therein and engaging the C-shaped bracket to prevent axial movement of the bracket within the axial opening. Additionally, means is positioned between distal end portions of the C-shaped bracket to prevent lateral movement of the bracket within the axial opening.

BRIEF DESCRIPTION OF THE DRAWINGS

Some of the objects and advantages of the present invention having been stated, others will be more fully understood from the detailed description which follows and by reference to the accompanying drawings in which:

FIG. 1 is a plan view of the apparatus for measuring an increase in diameter of a fuel rod in accordance with the present invention.

FIG. 2 is partial sectional view taken along line 2—2 of FIG. 1 and showing the gauge positioned within the receiving member.

FIG. 3 is a front view of the gauge of the present invention.

FIG. 4 is an exploded isometric view of the gauge and retaining members in accordance with the present invention.

DETAILED DESCRIPTION OF THE PREFERRED EMBODIMENT

Referring to the drawings, and more particularly to FIG. 1, a preferred embodiment of an apparatus for determining the pressurization in a nuclear fuel rod in accordance with the present invention generally indicated by reference numeral 10. The apparatus includes an elongate receiving member 20 having respective front and rear ends 21, 22. The front end 21 has an axial opening 23 extending into the receiving member 20 with the axial opening including an enlarged diameter outer portion 23 and a smaller diameter portion 23a extending axially inwardly from the portion 23. The axial opening defines a central axis, and as illustrated, the axial opening is adapted to receive at least one end 31 of a fuel rod 30 coaxially therein. The opposite end of the axial opening mounts a sleeve which defines an internal stop 26 which is adapted to engage the end 31 of the rod 30.

As shown in FIG. 2, and as will be explained in detail later, a gauge 40 adapted for measuring an increase in diameter of a nuclear fuel or control rod caused by a pressure increase within the rod is positioned in the axial opening 23, 23a and engages a fuel rod 30 received therein. The gauge 40 is formed as a substantially C-shaped bracket 41 having spaced distal end positions 42,43 and a medial portion 44 intermediate the distal end portions (FIG. 3). Spaced inner and outer surfaces 45, 46 circumferential to the central axis extend generally coaxially within the axial opening 23. The spaced distal end portions 42, 43 are substantially greater in radial thickness than the medial portion 44. The inner bracket surface 45 is dimensioned to frictionally receive the end of a nuclear fuel or other core component rod 30 therethrough so that the distal end portions 42, 43 are biased inwardly around the rod. A first electrical resistance strain gauge 50 is mounted on the medial portion outer surface 48 and a second electrical resistance strain gauge 60 is mounted on the medial portion inner surface 47. The strain gauges 50, 60 use conventional wheatstone bridge circuits and are connected by electrical wiring 71, 72, 73 to a conventional amplifier-microprocessor 80 for amplifying and measuring the electrical output from the strain gauges 50, 60 so that changes in electrical output from the strain gauges can be measured to determine an increase in the diameter of the fuel or control rod positioned within the axial opening 23, 23a upon pressurization of the rod. Stated in other words, the apparatus 10 determines whether proper pressurization of the fuel or control rod 30 has occurred by indicating whether the rod 30 has increased in diameter by a predetermined amount upon its internal pressurization.

Referring now again to FIG. 1, the receiving member 20 is formed from an elongate stainless steel shaft. The rear end 22 of the receiving member 20 has a coupler 24 attached by a threaded engagement. An extension 25 is attached to the coupler 24. The receiving member 20 is rotatably mounted to a support 90 by a conventional slip ring assembly 91. The support 90 is an elongate member formed from a stainless steel, plastic or other rigid material. The front end 92 of the support 90 includes a collet 93 attached thereon by conventional means such as threads or adhesive means, and a front opening 94 adapted to receive the receiving member extension 25. The receiving member 20 is retained therein by a spring connection means 95 such as commonly found in conventional slip ring applications. As will be explained in detail later, respective sets of individual electrical filament wires 71, 72 (FIG. 3) interconnect respective first and second strain gauges 50, 60 with the amplifier-microprocessor 80. The filament wires 71, 72 converge into small gauge multifilament cable wire 73 which extends axially along the outer surface 29 of the receiving member 20 (FIG. 2). The wire 73 extends through the slip ring assembly 91 and through the center of the support 90. A wire connector 96 positioned at the rear 97 of the support 90 interconnects a cable 98 connecting the amplifier-microprocessor 80 with the small gauge wire 73.

To use the apparatus 10 in accordance with the present invention, the apparatus is positioned in a large glove box (not shown) where nuclear fuel or control rods are positioned therein. One end of the rod is positioned adjacent conventional welding and pressurization apparatus adapted for pressurizing the fuel or control rods in a first step and then sequentially seal welding an axial opening or pressurization slots positioned at that end of the rod in a second step. An operator manually inserts the pressure sensing apparatus 10 over the other, free end of the rod so that the inner bracket surface 45 of the pressure sensing gauge 40 positioned therein engages the rod with distal end portions 42, 43 biased inwardly therearound. The rod 30 initially is rotating preparatory for pressurization and welding. As best illustrated in FIG. 2, the rod 30 frictionally engages the stop 26 positioned in the receiving member 20 so that as the rod rotates, the rod drivingly rotates the receiving member 20. As illustrated, the wire 73 passes through the slip ring assembly 91 which allows free rotation of the receiving member 20 without causing damage to the electrical wire 73.

After inserting the apparatus 10 over a rod 30, the amplifier-microprocessor 80 automatically compensates or "zeroes" the gauge 40 relative to the initial unpressurized diameter of the rod. If the axial opening or pressurization slots (not shown) are not sealed, the rod is pressurized with up to 600 psi of a required inert gas. The pressurization causes an increase in diameter of the rod 30 by as much as 0.1 mil (0.0254 millimeter). The increase in diameter causes the distal end portions 42, 43 of the bracket 41 biased inwardly around the rod to move outwardly, thus changing the length of the electrical resistance strain gauges 50, 60. The first outer electrical resistance strain gauge 50 is moved into compression and the second inner strain gauge 60 is pulled in tension. The change in electrical output from the strain gauges 50, 60 signifies that the rod has expanded from the pressure inside. The operator then welds the rod.

Referring now more particularly to FIGS. 2-4, the bracket 41 is positioned in the receiving member 20 between first and second spaced circular retaining members 100, 110 which are press fitted into the large diameter portion 23 of the axial opening. The retaining members 100, 110 each include axial openings 101, 111 dimensioned for receipt of the fuel or control rod 30 therethrough. As illustrated, the first retaining member 100 positioned adjacent the receiving member front end includes a chamfered edge 102 therearound to facilitate guidance of a rod 30 into the receiving member 20. If a rod 30 enters the receiving member 20 askew, the rod end 31 will engage the chamfered edge 102 of the first retaining member 100 and deflect coaxially into the receiving member 20. As rods are moved in and out of the receiving member 20, the retaining members 100, 110 prevent axial movement of the bracket 41 within the receiving member. A stop 120 is received in an opening 121 formed in the second retaining member 110 and which extends outwardly therefrom to a point positioned between the distal end portions 42, 43 of the bracket 41. The stop 120 thus acts to limit rotative movement of the bracket, in that rotative torque generated on the bracket 41 forces one of the distal end portions 42, 43 against the stop 120, which prevents further rotative movement of the bracket 41. The distal end portions 42, 43 are typically spaced no greater than about 0.3 radians from each other along a circumferential path, so as to assure the distal end portions engage a rod therearound.

As illustrated in FIG. 2, the outer surface 46 of the bracket 41 is dimensioned smaller than the diameter of the portion 23 of the axial opening of the receiving member 20, to allow limited radial movement of the bracket within the axial opening. Because of the size difference between the bracket 41 and portion 23, the bracket "floats" within the portion 23 allowing self-alignment of the bracket 41 over the rod. If the bracket 41 were stationary, and not "floating" the rod could damage the bracket at its more thin medial portion 44 as the rod enters the portion 23 of the receiving member 20 and engages the bracket 41, in that the bracket 41 would not "give" when the rod engaged the bracket. The full force of the entering rod would thus be directed against the bracket thereby damaging the bracket.

Referring now to FIG. 3, first and second electrical resistance strain gauges 50, 60 are mounted on respective medial portion outer and inner surfaces 48, 47 of the bracket 41. The strain gauges 50, 60 are conventional in design and adhesively attached to the bracket 41. The medial portion outer surface 48 is flattened along a chord line of the circle formed by the outer surface 46 to provide a flat receiving area for attachment of the first strain gauge 50 thereto. The medial portion inside surface 47 of the bracket 41 includes an arcuate recessed portion 49 adapted to receive the second strain gauge 60 therein. The recess 49 not only serves as an area for placement of the second strain gauge 60 therein, but also it prevents engagement of the second strain gauge with a rod or other object positioned in the bracket 41. The second strain gauge 60 is positioned in the recess 49 below the position the rod would occupy.

As illustrated first and second sets of electrical filament wires 71, 72 connect respective first and second strain gauges 50, 60 and converge into the multifilament cable wire 73 interconnecting the amplifier-microprocessor. Each individual wire is 36 gauge in a preferred embodiment and connects respective strain gauges by conventional soldered connections. A first annular slot 130 is formed along the inside surface of the bracket 41. The first slot 130 is formed to a depth to allow the filament wires 72 connecting the second strain gauge 60 to lie therein so as to prevent interference between the filament wires and a rod positioned in the bracket 41. An orifice 131 is positioned in the slot 130 and extends radially between the slot and the outer surface 46 of the bracket 41 and provides a passage through the bracket for the filament wires 72 connecting the second strain gauge 60. A second annular slot 140 extends along the perimeter of the bracket outer surface 46 and is formed to a depth to allow the filament wires 71 connecting the first strain gauge 50 to lie therein so as to prevent interference between the wires and the axial opening portion 23.

As noted above, the individual filament wires 71, 72 converge into one small gauge multifilament cable wire 73 which passes through an orifice 27 adjacent the bracket 41 between the axial opening portion 23 and the outer surface 29 of the receiving member. The wire extends axially along the outer surface 29, through the slip ring assembly 91 and support 90 to the amplifier-microprocessor 80.

Although not illustrated, the receiving member 20 can be covered with a thermoplastic or other plastic to not only protect the multifilament cable wire 73 extending along the outer surface 29, but also provide a smoother surface thereon. As noted above, when the apparatus is in use, the receiving member 20 rotates together with a rotating rod 30 positioned therein. The smoother surface created by a plastic coating on the receiving member 20 facilitates handling and minimizes damage to any wire extending therealong.

The foregoing embodiment is to be considered illustrative, rather than restrictive of the invention and the modifications which come within the meaning and range of equivalent of the claims are to be included therein.

That which is claimed is:

1. An apparatus for determining pressurization in a nuclear fuel rod and the like by measuring an increase in diameter of the fuel rod occasioned by the internal pressurization of the fuel rod comprising an elongate receiving member having front and rear ends, said front end having an axial opening extending into said member and defining a central axis, and with said axial opening being adapted to receive at least one end of a fuel rod coaxially therein, gauging means positioned in said axial opening for measuring an increase in diameter of a fuel rod caused by a pressure increase within the rod, said gauging means comprising a substantially C-shaped bracket having spaced, distal end portions and a medial portion intermediate said distal end portions, spaced inner and outer surfaces circumferential to said central axis extending coaxially within said axial opening, said distal end portions being substantially greater in radial thickness than said medial portion, and said inner bracket surface being dimensioned to frictionally receive the end of a nuclear fuel rod therethrough so that said distal end portions are biased inwardly around said fuel rod, a first electrical resistance strain gauge means mounted on the outer surface at said medial portion and a second electrical resistance strain gauge means mounted on said inner surface at said medial portion, and processing means electrically connected to said first and second strain gauge means for measuring electrical output from said strain gauge means, wherein changes in electrical output from said strain gauge means can be measured to determine an increase in the diameter of the fuel rod positioned within said axial opening upon pressurization of the fuel rod.

2. The apparatus as claimed in claim 1 wherein said elongate receiving member includes means positioned therein and engaging said C-shaped bracket to prevent axial movement of said bracket within said axial opening.

3. The apparatus as claimed in claim 1 including means positioned between said distal end portions of said C-shaped bracket to prevent rotative movement of said bracket within said axial opening.

4. The apparatus as claimed in claim 1 wherein said outer surface is dimensioned to permit limited radial movement of said C-shaped bracket within said axial opening.

5. The apparatus as claimed in claim 1 including support means rotatably mounting the rear end of said receiving member allowing rotation of said receiving member when said support means is held stationary.

6. The apparatus as claimed in claim 1 wherein said first and second strain gauge means are each adhesively attached to said bracket.

7. An apparatus for determining pressurization in a nuclear fuel rod and the like by measuring the increase in diameter of the fuel rod occasioned by the internal pressurization of the fuel rod comprising
an elongate receiving member having an outer surface and front and rear ends, said front end having an axial opening extending into said member and defining a central axis, and with said axial opening being adapted to receive at least one end of a fuel rod coaxially therein,
first and second axially spaced retaining means positioned within said receiving member, said retaining means having openings therethrough and aligned coaxially with said receiving member axial opening and being dimensioned to receive a fuel rod therethrough,
gauging means positioned in said axial opening between said first and second retaining means for measuring the increase in diameter of a fuel rod caused by a pressure increase within the rod, said gauging means comprising a substantially C-shaped bracket having spaced, distal end portions and a medial portion intermediate said distal end portions, spaced inner and outer surfaces circumferential to said central axis extending coaxially within said axial opening, said distal end portions being substantially greater in radial thickness than said medial portion, said inner bracket surface being dimensioned to frictionally receive the end of a nuclear fuel rod therethrough so that said distal end portions are biased inwardly around said fuel rod, and said outer bracket surface being dimensioned to permit limited radial movement of said C-shaped bracket within said axial opening so that said bracket can align itself with a fuel rod when inserted within said receiving member, a first electrical resistance strain gauge means mounted on the outer surface at said medial portion and a second electrical resistance strain gauge means mounted on said inside surface at said medial portion,
support means rotatably mounting the rear end of said receiving member allowing rotation of said receiving member when said support means is held stationary, and
processing means electrically connected to said first and second strain gauge means for measuring electrical output from said strain gauge means, wherein changes in electrical output from said strain gauge means can be measured to determine the increase in the diameter of the fuel rod positioned within said axial opening upon pressurization of the fuel rod.

8. The apparatus as claimed in claim 7 including electrically conducting wire interconnecting said first and second strain gauge means with said processing means, and an orifice in said receiving member and extending radially between said axial opening adjacent said bracket and the outer surface of said receiving member, and with said electrically conducting wire extending through said orifice.

9. The apparatus as claimed in claim 8 wherein said support means includes slip ring means interconnecting said receiving member, said electrically conducting wire extending axially along the outer surface of said receiving member and through said slip ring means to prevent damage to said electrically conducting wire when said receiving member rotates.

10. A gauge adapted for determining the increase in diameter of a tube or other rod-like objects comprising
a substantially C-shaped bracket having spaced, distal end portions and a medial portion intermediate said distal end portions spaced inner and outer surfaces circumferential to a central axis defined by the C-shaped bracket, said distal end portions being substantially greater in radial thickness than said medial portion, and said inner bracket surface being dimensioned to receive in frictional engagement thereto and in coaxial alignment with said central axis the object to be measured so that said distal end portions are biased inwardly around said object, and
a first electrical strain gauge means mounted on the outer surface at said medial portion and a second electrical strain gauge means mounted on said inside surface at said medial portion, wherein changes in electrical output from said strain gauge means can be measured to determine any increase in the diameter of an object engaged by said distal end portions.

11. The gauge as claimed in claim 10 wherein said second strain gauge means includes electrically conducting wire for connecting said second electrical resistance strain gauge means with a microprocessor or other processing means, and a slot extending circumferentially along the inside surface of said bracket and being dimensioned for the receipt of said electrically conducting wire so as to prevent interference between the electrically conducting wire and the object to be measured when received within said bracket.

12. The gauge as claimed in claim 11 further including an orifice in said bracket and extending radially between said slot and the outer surface of said bracket to provide a passage through said bracket for said electrically conducting wire.

13. The gauge as claimed in claim 10 wherein said first electrical resistance strain gauge means includes electrically conducting wire for connecting said first electrical resistance strain gauge means with a microprocessor or other processing means, and a slot extending along the outside surface of said bracket and being dimensioned for the receipt of said electrically conducting wire so as to prevent interference between the electrically conducting wire and the inside surface of a receptacle or other means adapted to retain the gauge therein.

14. The gauge as claimed in claim 10 wherein said distal end portions are spaced no greater than about 0.3 radians from each other in a circumferential path extending along the outside surface of said C-shaped bracket.

15. The gauge as claimed in claim 10 wherein the medial inside surface of said bracket includes an arcuate recessed portion, and wherein said second strain gauge means is received in said recessed portion so as prevent engagement of said strain gauge means with an object to be measured when received within said bracket.

16. The gauge is claimed in claim 10 wherein the outer surface of said bracket includes a flattened portion at said medial portion to provide a receiving area for attachment of said first strain gauge means thereto.

* * * * *